(12) United States Patent
Oh et al.

(10) Patent No.: US 10,091,406 B2
(45) Date of Patent: Oct. 2, 2018

(54) IMAGE CAPTURING APPARATUS

(71) Applicant: LG ELECTRONICS INC., Seoul (KR)

(72) Inventors: Hyunseok Oh, Seoul (KR); Ikhyun Jo, Seoul (KR); Hyungoo Joo, Seoul (KR); Kiju Yun, Seoul (KR); Hanhee Cho, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 110 days.

(21) Appl. No.: 15/234,727

(22) Filed: Aug. 11, 2016

(65) Prior Publication Data

US 2017/0264810 A1    Sep. 14, 2017

(30) Foreign Application Priority Data

Mar. 14, 2016  (KR) .................. 10-2016-0030485

(51) Int. Cl.
*H04N 5/225* (2006.01)
*H04N 5/232* (2006.01)

(52) U.S. Cl.
CPC ....... *H04N 5/23203* (2013.01); *H04N 5/2252* (2013.01)

(58) Field of Classification Search
CPC ... H04N 5/2251; H04N 5/2252; H04N 5/2257
USPC ................................................ 348/373, 374
See application file for complete search history.

(56) References Cited

U.S. PATENT DOCUMENTS

| 4,918,521 | A  | * | 4/1990  | Yabe ............... A61B 1/00179 |
|           |    |   |         | 348/373                          |
| 6,830,387 | B2 | * | 12/2004 | Rife ............... G08B 13/19619 |
|           |    |   |         | 250/363.02                       |
| 7,893,958 | B1 | * | 2/2011  | D'Agostino ........ B60R 11/04    |
|           |    |   |         | 348/148                          |
| 9,396,633 | B1 | * | 7/2016  | Sannala .......... G08B 13/19619  |
| 9,615,011 | B1 | * | 4/2017  | Fleming ............ H04N 5/2257  |
| 2004/0027459 | A1 | * | 2/2004 | Segawa ............ A61B 1/0011   |
|           |    |   |         | 348/207.99                       |
| 2014/0240581 | A1 |   | 8/2014 | Sung et al.                       |
| 2014/0340576 | A1 |   | 11/2014 | Kim et al.                       |
| 2015/0237252 | A1 | * | 8/2015 | O'Donnell ........ H04N 5/23206   |
|           |    |   |         | 348/158                          |

(Continued)

FOREIGN PATENT DOCUMENTS

| CA | 2835623 A1 | * | 6/2014 | ............ G01S 19/14 |
| JP | 2003-255211 A |   | 9/2003 | |

(Continued)

*Primary Examiner* — Anthony J Daniels
(74) *Attorney, Agent, or Firm* — Birch, Stewart, Kolasch & Birch, LLP

(57) ABSTRACT

The present disclosure relates to an image capturing apparatus, and the image capturing apparatus may include a hollow body formed with opening portions at both ends thereof, a first cover provided with a window, and coupled to the body to cover one end portion of the body, a second cover coupled to the body to cover the other end portion of the body, a frame provided in an inner space of the body and coupled to the body, and an antenna provided between the frame and the body, and the antenna may be formed on an outer circumferential surface of the frame.

20 Claims, 15 Drawing Sheets

(56) References Cited

U.S. PATENT DOCUMENTS

| | | | | |
|---|---|---|---|---|
| 2015/0341555 A1* | 11/2015 | Artonne | ................ | G03B 37/00 |
| | | | | 348/36 |
| 2015/0381859 A1* | 12/2015 | Cover | ................ | H04N 5/2252 |
| | | | | 348/374 |
| 2016/0182826 A1* | 6/2016 | Blum | ................ | H04N 5/23241 |
| | | | | 348/372 |

FOREIGN PATENT DOCUMENTS

| KR | 20-0217799 Y1 | 3/2001 |
|---|---|---|
| KR | 20-0386890 Y1 | 6/2005 |
| KR | 10-2014-0107145 A | 9/2014 |

* cited by examiner

IMAGE CAPTURING APPARATUS

CROSS-REFERENCE TO RELATED APPLICATIONS

Pursuant to 35 U.S.C. § 119(a), this application claims the benefit of earlier filing dates and rights of priority to Korean Application No. 10-2016-0030485, filed on Mar. 14, 2016, the contents of which are incorporated by reference herein in its entirety.

BACKGROUND OF THE INVENTION

1. Field of the Invention

The present disclosure relates to an image capturing apparatus having an antenna.

2. Description of the Related Art

Terminals may be generally classified into mobile/portable terminals or stationary terminals according to their mobility. Mobile terminals may also be classified as handheld terminals or vehicle mounted terminals according to whether or not a user can directly carry the terminal.

Mobile terminals have become increasingly more functional. Examples of such functions include data and voice communications, capturing images and video via a camera, recording audio, playing music files via a speaker system, and displaying images and video on a display. Some mobile terminals include additional functionality which supports game playing, while other terminals are configured as multimedia players. More recently, mobile terminals have been configured to receive broadcast and multicast signals which permit viewing of content such as videos and television programs.

As it becomes multifunctional, a mobile terminal can be allowed to capture still images or moving images, play music or video files, play games, receive broadcast and the like, so as to be implemented as an integrated multimedia player.

On the other hand, when an image capturing apparatus for capturing an image is used with the terminal in connection with wireless communication or the like, more various images may be provided to a user, and the user's desired images may be provided.

SUMMARY OF THE INVENTION

An object of the present disclosure is to solve the foregoing problem and other problems. Another object of the present disclosure is to provide an image capturing apparatus capable of wireless communication through an antenna.

In order to accomplish the above and other objects, according to an aspect of the present disclosure, there may be provided an image capturing apparatus, and the image capturing apparatus may include a hollow body formed with opening portions at both ends thereof; a first cover provided with a window, and coupled to the body to cover one end portion of the body; a second cover coupled to the body to cover the other end portion of the body; a frame provided in an inner space of the body and coupled to the body; and an antenna provided between the frame and the body, wherein the antenna is formed on an outer circumferential surface of the frame.

According to an aspect of the present invention, a first recess portion recessed toward an inward direction may be provided at one side of the frame to accommodate a lens assembly, and a plate formed with one or more holes may be provided at the other side of the frame.

According to an aspect of the present invention, the frame may include a middle frame connected between the first recess portion and the plate; and lateral frames formed at both sides of the middle frame to limit a space by the plate, middle frame and first recess portion.

According to an aspect of the present invention, the second cover may include a fastening portion in a plate shape fastened to the body and provided with a second recess portion; and a cap portion, one side of which is rotatably coupled to the fastening portion to open or close the second recess portion.

According to an aspect of the present invention, a plurality of through holes communicating with a plurality of holes formed on the plate may be formed on the second recess portion.

According to an aspect of the present invention, a first waterproof member formed in close contact with the second recess portion to seal the plurality of through holes may be formed on an inner surface of the cap portion facing the second recess portion.

According to an aspect of the present invention, a second waterproof member closely formed in close contact with the plate to seal a plurality of holes formed on the plate may be formed on an inner surface of the fastening portion facing the plate.

According to an aspect of the present invention, a circuit board is provided on one surface of the middle frame, and a battery is provided on the other surface of the frame.

According to an aspect of the present invention, a lens accommodation portion protruded toward the lens assembly may be formed on an inner surface of the first cover.

According to an aspect of the present invention, the circuit board may be formed by depositing two or more sub-circuit boards, and the sub-circuit boards may be electrically connected to each other by a flexible printed circuit board in at least one region.

According to an aspect of the present invention, electronic components may be mounted on at least one surface of the sub-circuit board, and shield members for blocking electromagnetic waves by the electronic components may be formed thereon, and a shock absorbing member may be provided between the shield members adjacent to each other.

According to an aspect of the present invention, the first recess portion may have a shape corresponding to the lens assembly, and an audio input module accommodation portion in which a microphone module is accommodated may be provided on an outer circumferential surface of the first recess portion, and a rubber member for surrounding the microphone module may be provided in the audio input module accommodation portion, and a third waterproof member may be provided between the audio input module accommodation portion and an inner surface of the first cover.

According to an aspect of the present invention, an upper frame coupled to the plate and first recess portion while covering the circuit board may be formed at an upper side of the circuit board.

According to an aspect of the present invention, a third recess portion may be formed on one surface of the upper frame, and a flexible printed circuit board may be formed on the third recess portion, and a microphone module may be connected to an end portion of the flexible printed circuit board.

According to an aspect of the present invention, one or more domes may be provided on one surface of the flexible printed circuit board, and a button may be formed in a region corresponding to the dome on an inner surface of the body.

According to an aspect of the present invention, the button may include a pressing portion exposed to an outside; and an actuator extended from one surface of the pressing portion to press the dome.

According to an aspect of the present invention, a waterproof member accommodation portion in which the third waterproof member is accommodated may be formed on an inner surface of the first cover.

According to an aspect of the present invention, a flange protruded toward an outside may be formed along an edge of the fastening portion, and part of the cap portion may be fixed to the fastening portion by a hinge axis, and a button portion may be provided in a region between the second recess portion and the flange, and the button portion may be accommodated into a button groove formed on a lateral surface of the cap portion, and an elastic member for providing an elastic force to the button portion may be provided between the flange and the button portion.

According to an aspect of the present invention, the first cover and the second cover may be coupled to the body by a screw or adhesive.

According to an aspect of the present invention, a screw hole may be formed on an outer surface of the body, and a screw insert may be provided in the screw hole, and the screw may be fastened to the screw insert to seal a portion at which the body is fastened to the first cover or second cover.

According to an aspect of the present invention, the antenna may include a first antenna formed on a lateral surface of the first recess portion and the lateral frames; and a second antenna and a third antenna formed on lateral frames formed adjacent to the plate, and the first through the third antenna may be fed from a feed terminal formed on the frame.

According to an aspect of the present invention, the feeding terminal may be formed on a protruding portion protruded from the middle frame, and the feeding terminal may be connected to the circuit board.

The effect of an image capturing apparatus and a control method thereof according to the present disclosure will be described as follows.

According to at least one of the embodiments of the present disclosure, an antenna may be provided, thereby providing an image capturing apparatus capable of wireless communication.

According to at least one of the embodiments of the present disclosure, various waterproof structures may be provided, thereby having an advantage of allowing audio input/output and waterproof capabilities.

According to at least one of the embodiments of the present disclosure, it has an advantage capable of checking an image being recorded by a user in real time by WiFi or LTE wireless communications with a mobile terminal.

According to at least one of the embodiments of the present disclosure, a user may check an image being recorded in real time, thereby capturing his or her desired image. In other words, it has an advantage of allowing a user to adjust his or her desired specific direction, distance while viewing a video being recorded in real time, and allowing the enlargement and reduction of an image being captured.

Further scope of applicability of the present invention will become apparent from the detailed description given hereinafter. However, it should be understood that the detailed description and specific examples such as preferred embodiments of the invention are given by way of illustration only, since various changes and modifications within the spirit and scope of the invention will become apparent to those skilled in the art from this detailed description.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE INVENTION

Description will now be given in detail according to the exemplary embodiments disclosed herein, with reference to the accompanying drawings. For the sake of brief description with reference to the drawings, the same or equivalent components will be provided with the same reference numbers, and description thereof will not be repeated. A suffix "module" and "unit" used for constituent elements disclosed in the following description is merely intended for easy description of the specification, and the suffix itself does not give any special meaning or function. In describing the present disclosure, if a detailed explanation for a related known function or construction is considered to unnecessarily divert the gist of the present disclosure, such explanation has been omitted but would be understood by those skilled in the art. The accompanying drawings are used to help easily understand the technical idea of the present disclosure and it should be understood that the idea of the present disclosure is not limited by the accompanying drawings. The idea of the present disclosure should be construed to extend to any alterations, equivalents and substitutes besides the accompanying drawings.

It will be understood that, although the terms first, second, etc. may be used herein to describe various elements, these elements should not be limited by these terms. These terms are only used to distinguish one element from another.

It will be understood that when an element is referred to as being "connected with" another element, the element can be directly connected with the other element or intervening elements may also be present. In contrast, when an element is referred to as being "directly connected with" another element, there are no intervening elements present.

A singular representation may include a plural representation as far as it represents a definitely different meaning from the context.

Terms "include" or "has" used herein should be understood that they are intended to indicate the existence of a feature, a number, a step, a constituent element, a component or a combination thereof disclosed in the specification, and it may also be understood that the existence or additional possibility of one or more other features, numbers, steps, constituent elements, components or combinations thereof are not excluded in advance.

Figure 1:
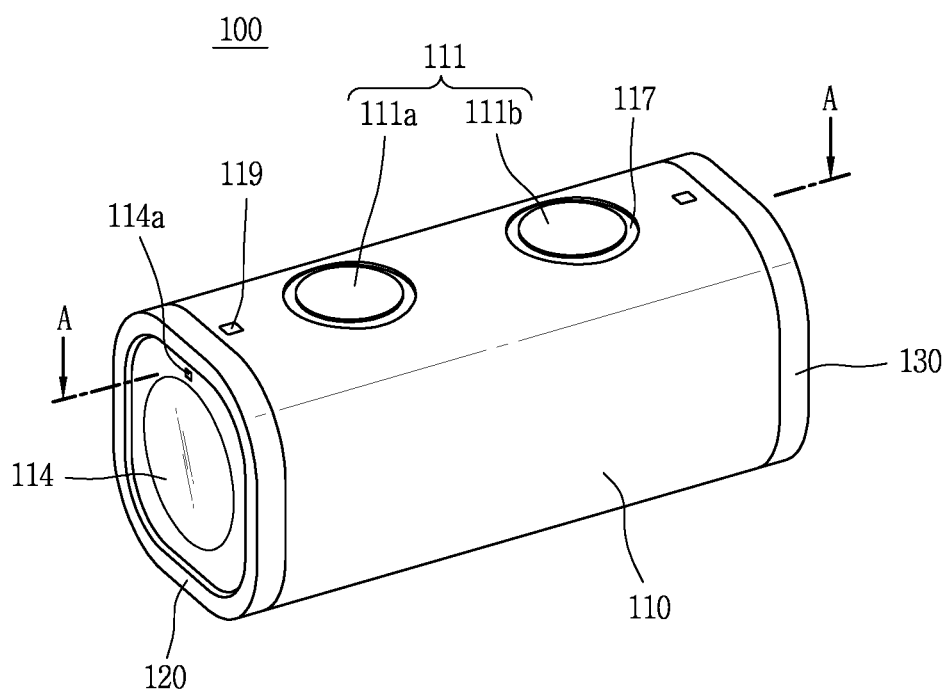
FIG. 1 is a whole perspective view illustrating an image capturing apparatus according to an embodiment of the present disclosure.
Figure 2:
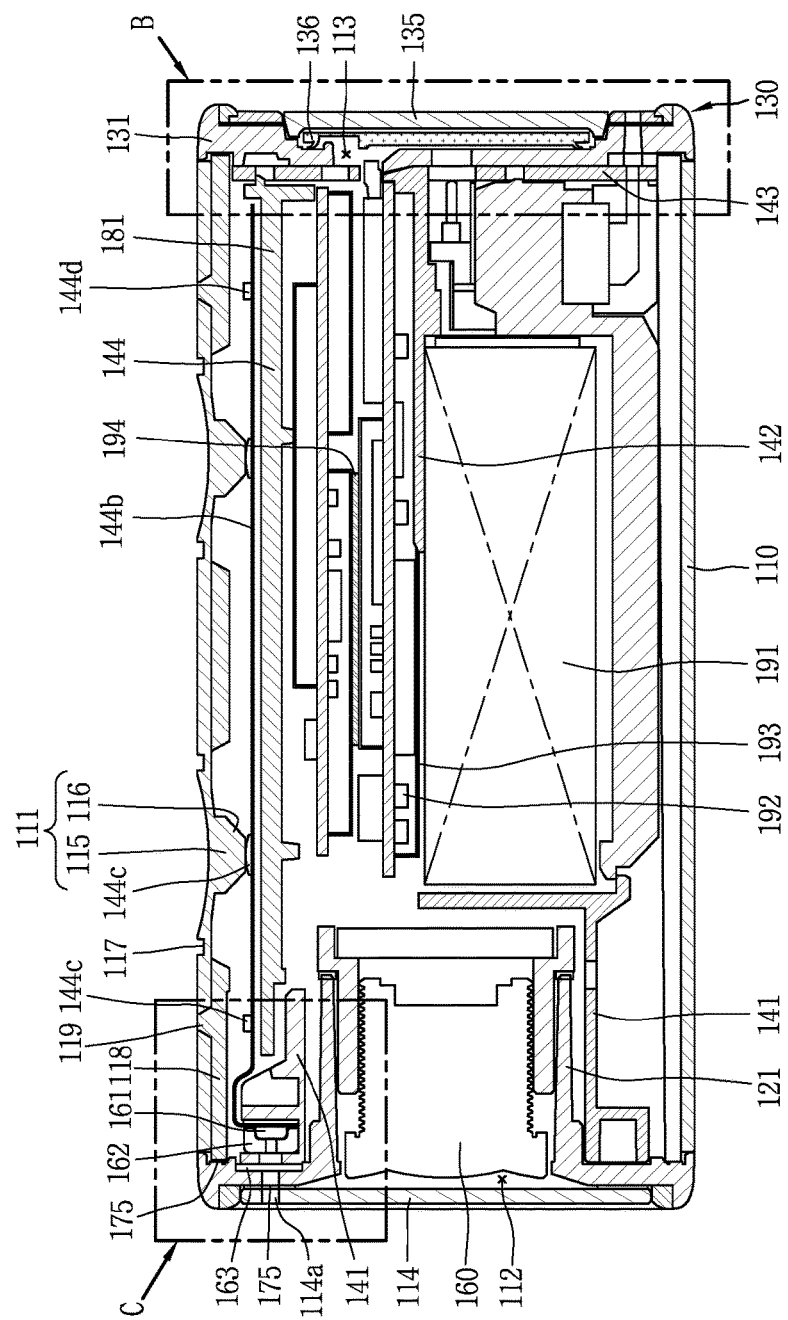
FIG. 2 is a cross-sectional view taken along line A-A in FIG. 1.
Figure 3:
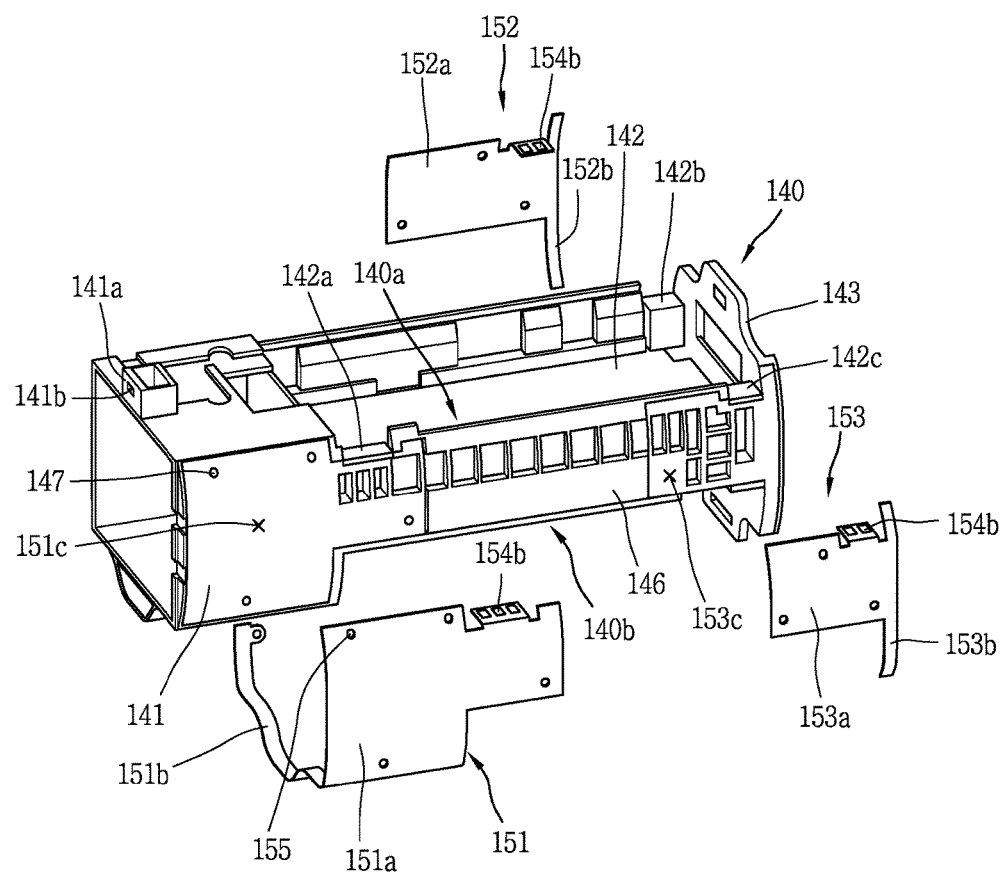
FIG. 3 is an exploded perspective view illustrating a frame and an antenna coupled to the frame according to an embodiment of the present disclosure.

FIG. 1 is a whole perspective view illustrating an image capturing apparatus 100 according to an embodiment of the present disclosure, and FIG. 2 is a cross-sectional view taken along line A-A in FIG. 1, and FIG. 3 is an exploded perspective view illustrating a frame 140 and an antenna 150 coupled to the frame 140 according to an embodiment of the present disclosure.

Referring to FIGS. 1 through 3, the image capturing apparatus 100 according to an embodiment of the present disclosure may include a body 110, a frame 140 provided within the body 110 to form a backbone of the image capturing apparatus 100, and a first cover 120 and a second cover 130 configured to cover a front and a rear surface of the frame 140. The body 110 has a hollow shape formed with opening portions 112, 113 at both ends thereof, and may have a cylindrical or polygonal columnar shape. The frame 140 is provided in an inner space of the body 110, and at least part thereof is coupled to the body 110. FIG. 2 illustrates that the frame 140 is coupled to the body 110 by an adhesive tape 175. The first cover 120 is formed to cover either one 112 of the opening portions 112, 113 of the body 110, and for an example, may be formed to cover a front surface of the body 110. Here, the first cover 120 is provided with a window 114 to form a path for receiving light for photographing.

Furthermore, the second cover 130 is coupled to the body 110 to cover the remaining one 113 of the opening portions 112, 113 of the body 110, and for an example, may be formed to cover a rear surface of the body 110.

Hereinafter, it will be described that a front surface of the image capturing apparatus 100 according to an embodiment of the present disclosure denote a direction in which light for photographing is incident, and a rear surface of the image capturing apparatus 100 denotes an opposite direction to the front surface. In other words, when an image is captured with the image capturing apparatus 100, a portion located away from the user is a front surface, and a portion located closer to the user is a rear surface. It will be used to have the same meaning even in the body 110 and frame 140.

Accordingly, the first cover 120 is a case configured to cover a front surface of the image capturing apparatus 100, more specifically, body 110, and the second cover 130 is a case configured to cover a rear surface of the body 110. The body 110, first cover 120 and second cover 130 may all form an outer appearance of the image capturing apparatus 100, but the first cover 120 and second cover 130 will be referred to as a cover in covering the opening portions 112, 113 of the body 110, for the sake of convenience of explanation.

The frame 140 forms a backbone of the image capturing apparatus 100, and provides a space in which components constituting the image capturing apparatus 100 is accommodated. For an example, electronic components 192 including a battery 191, a circuit board 181 and the like may be accommodated into spaces 140a, 140b limited by the frame 140.

On the other hand, according to an embodiment of the present disclosure, the image capturing apparatus 100 may include an antenna 150 provided between the frame 140 and the body 110. the antenna 150 is formed on an outer circumferential surface of the frame 140, and provided with one or more antennas 151, 152, 153 to implement a plurality of frequency bandwidths. For an example, the first antenna 151 for implementing a first frequency bandwidth is provided at a portion adjacent to the front surface of the frame 140, and the second antenna 152 for implementing a second frequency bandwidth and the third antenna 153 for implementing a third frequency bandwidth are provided at a portion adjacent to the rear surface of the frame 140. At least part of the first through the third frequency bandwidth may overlap or may not overlap.

For an example, the first frequency bandwidth may be LTE B5/B20/B7, and the second frequency bandwidth may be LTE B1/B2/B3, and the third frequency bandwidth may be BT/WIFI, GPS.

The first antenna 151 is a main antenna 150, and the first through the third antenna 151, 152, 153 may include a major surface portion 151a, 152a, 153a having a large area to be attached to the frame 140 and a tail portion 151b, 152b, 153b extended from one end portion of the major surface portion 151a, 152a, 153a and formed in a thin and elongated manner. A communication function may be maximized by directing radiation to a large area by the major surface portion 151a, 152a, 153a, and the tail portion 151b, 152b, 153b may be used to implement a resonant frequency in a region to be implemented by the first through the third antenna 151, 152, 153, respectively. In other words, the primary radiation of the antenna 150 is carried out by the major surface portion 151a, 152a, 153a and a small amount of electromagnetic waves are radiated from the tail portion 151b, 152b, 153b formed in a length required for impedance matching compared to that of the major surface portion 151a, 152a, 153a. Here, an antenna forming region 151c of the frame 140 is recessed to form the first through the third antenna 151, 152, 153 to secure a space capable of mounting the major surface portion 151a, 152a, 153a of the first through the third antenna 151, 152, 153.

Furthermore, a through hole 155 is formed on the major surface portion 151a, 152a, 153a of the antenna 150, and a protrusion 147 is formed in a region 151c disposed with the antenna 150, and thus the major surface portion 151a, 152a, 153a of the antenna 150 is stably formed on the frame 140 at a predetermined location.

A first recess portion 141 recessed toward an inward direction is provided at one side of the frame 140 such that a lens assembly 160 is inserted into an inner space of the first recess portion 141, and a plate 143 formed with one ore more through holes 145, 145a may be provided at the other side of the frame 140. For an example, the first recess portion 141 is formed at a front side of the frame 140, and the plate 143 is formed at a rear side of the frame 140. The first recess portion 141 is formed in a region over a predetermined distance to have a cylindrical or polygonal shaped lens assembly 160. In other words, the lens assembly 160 is formed in a length direction of the image capturing apparatus 100, and some lenses constituting the lens assembly 160 may move over a predetermined section in the length direction for focusing, and thus the first recess portion 141 should be formed to have a depth in consideration of this.

As described above, the first recess portion 141 should be formed in at least a length as that of lens assembly 160, and should be formed to surround the lens assembly 160, and thus should have a polygonal or cylindrical shape.

On the other hand, the antenna 150 should be provided within the image capturing apparatus 100 for waterproof performance, and a partial shape of the frame 140 may be formed in a polygonal or cylindrical shape, thereby securing a large area 151c capable of forming the antenna 150. In this manner, an area of the antenna 150 may be secured to the maximum while having a structure of surrounding the frame 140. Here, a space for accommodating the audio input module 161 should be provided on an upper surface of the frame 140, and most of the first antenna 151 is adhered to a lateral region of the first recess portion 141. It to is similar to even the second antenna 152 and third antenna 153. Here, the tail portion 151b, 152b, 153b is formed to surround an outer circumferential surface of both end portions of the frame 140.

Here, according to an embodiment of the present disclosure, a direction connecting a front surface and a rear surface of the image capturing apparatus 100 may be referred to as a length direction, and a direction perpendicular to the length direction may be referred to as a thickness direction. In particular, when the image capturing apparatus 100 has a cylindrical shape, the length direction may be an axial direction of the image capturing apparatus 100, and the thickness direction may be a radial direction thereof. Furthermore, according to an embodiment of the present disclosure, an upper surface denotes a surface formed with a button 111 formed on the body 110, and a lower surface denotes a surface opposite to the upper surface. It may be similarly used even in case where the image capturing apparatus 100 has a polygonal or cylindrical shape, and may be similarly used for the frame 140.

Hereinafter, the structure of the frame 140 will be described in more detail.

Figure 4:
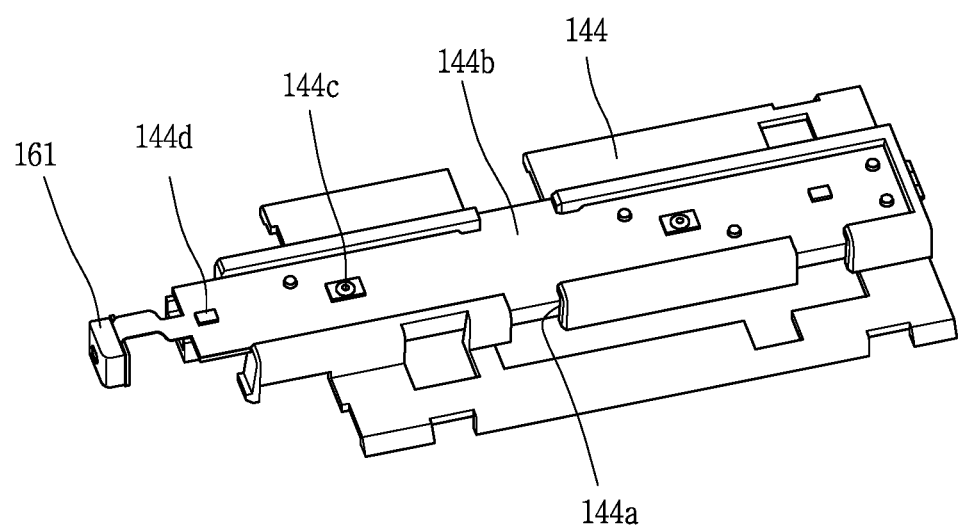
FIG. 4 is a view illustrating an upper frame and a flexible printed circuit board provided on the upper frame according to an embodiment of the present disclosure.

FIG. 4 is a view illustrating an upper frame 140 and a flexible printed circuit board 144b provided on the upper frame 140 according to an embodiment of the present disclosure, and hereinafter, the present disclosure will be described with reference to FIGS. 2 through 5.

As described above, the first recess portion 141 is provided on a front surface of the frame 140, and the plate 143 is provided on a rear surface of the frame 140. A substantially H-shaped frame 140 is provided between the first recess portion 141 and the plate 143, and a middle frame 142 connecting the first recess portion 141 and plate 143 and lateral frames 146 formed at both sides of the middle frame 142 for limiting a space by the plate 143, middle frame 142 and first recess portion 141 are formed. The plate 143 is formed to face a lower surface of the first recess portion 141 to be separated therefrom, and the lateral frames 146 are formed in a direction crossing the middle frame 142, for example, in a vertical direction.

The lateral frames 146 are formed to cross the middle frame 142 in a substantially vertical direction along a length direction at both sides of the middle frame 142. Here, an upper space 140a and a lower space 140b are formed by one surface (lower surface) of the middle frame 142, lateral frames 146, plate 143 and first recess portion 141. The circuit board 181 is provided on one surface (upper surface) of the middle frame 142, and the battery 191 is provided on the other surface (lower surface) of the frame 140. In other words, the circuit board 181 may be provided in the upper space 140a and the battery 191 may be provided in the lower space 140b.

Furthermore, an upper frame 144 coupled to the plate 143 and first recess portion 141 while covering the circuit board 181 is formed at an upper side of the circuit board 181. The upper frame 144 is formed with a third recess portion 144a to have a flexible printed circuit board 144b. The flexible printed circuit board 144b is electrically connected to the circuit board 181 provided in the upper space 140a, and a dome 144c and a light source 144d are provided on an upper surface of the flexible printed circuit board 144b, and the audio input module 161 is provided at an end portion of the flexible printed circuit board 144b. The dome 144c may be user to perform a function of actuating the image capturing apparatus 100 when pressing the button 111 formed on the body 110 or change a capture mode. For example, a first button 111a performs a function for supplying or blocking power, and a second button 111b performs a function of changing a capture mode such as image capture or video capture during the operation of the image capturing apparatus 100.

Referring to FIGS. 1 and 2 again, an upper surface of the body 110 is double injected along with a light guide member 118 with a transparent or semi-transparent material, thereby easily transferring light due to the light source 144d provided on the flexible printed circuit board 144b to an outside. Certain information may be provided to a user by a method of turn on/off or blinking light due to the light source 144d. The light guide member 118 is provided at a position facing the light source 144d, and the light guide member 118 may include an exposure portion 119 from which a predetermined region is exposed, and formed along a length direction at an inner side of the body 110 forming an outer appearance, and the exposure portion 119 may be preferably located in a direct upward direction of the light source 144d. The light guide member 118 may be poly carbonate (PC) material, but may not be particularly limited as far as it is transparent or semi-transparent material.

As described above, light due to the light source 144d may be transferred to an outside through the exposure portion 119 exposed to the outside through the light guide member 118 while at the same enhancing rigidity adjacent to the button 111 of the body 110.

The light source 144d may be an LED emitted in three colors, or three colors with red, green and blue or formed with three colors other than those.

Blue light may be emitted when an image (including a picture or video) is transmitted to a terminal 200 through WiFi, and red light may be emitted when the image is transmitted to a server 300 through LTE. Furthermore, light may be continuously emitted in a video capture mode, and the light source 144d may be blinking in a capture standby mode, thereby notifying a user of the current status of the image capturing apparatus 100.

Furthermore, there may be provided one or more buttons 111, and two buttons are illustrated according to an embodiment of the present disclosure, but the present disclosure may not be necessarily limited to this. The button 111 may include a pressing portion 115 formed to form an outer appearance of the body 110, and exposed to an outside and pressed by a user and an actuator 116 extended from one surface of the pressing portion 115 to press the dome 144c. The exposure surface of the exposure portion 119 has a shape concave toward a lower portion thereof, and the actuator 116 is protruded in a convex manner toward the lower portion (dome 144c). Furthermore, a variable portion 117 concave toward the lower portion to be easily stretched when pressing the button 111 is formed between the exposure portion 119 and the body 110. The variable portion 117 is formed in a circular shape along an outer edge of the exposure portion 119. When the button 111 is pressed by the variable portion 117, the feeling of pressing the button 111 may be transferred to the user.

Moreover, the light guide member 118 is formed to avoid a region provided with the button 111 to allow the actuator 116 to be easily brought into contact with the dome 144c. For example, when the light guide member 118 is formed up to a region immediately adjacent to the actuator 116, the button 111 may not be easily pressed. The actuator 116 may have a semi-spherical shape, and as illustrated in FIG. 2, may be formed to be convex in a downward direction while having a predetermined angle.

Figure 5:
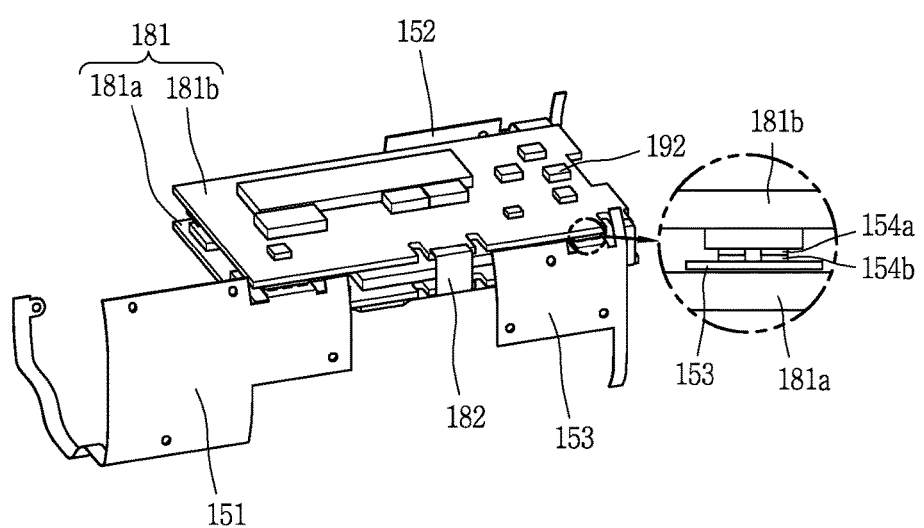
FIG. 5 is a view illustrating a shape of an antenna connected to a circuit board according to an embodiment of the present disclosure.
Figure 12:
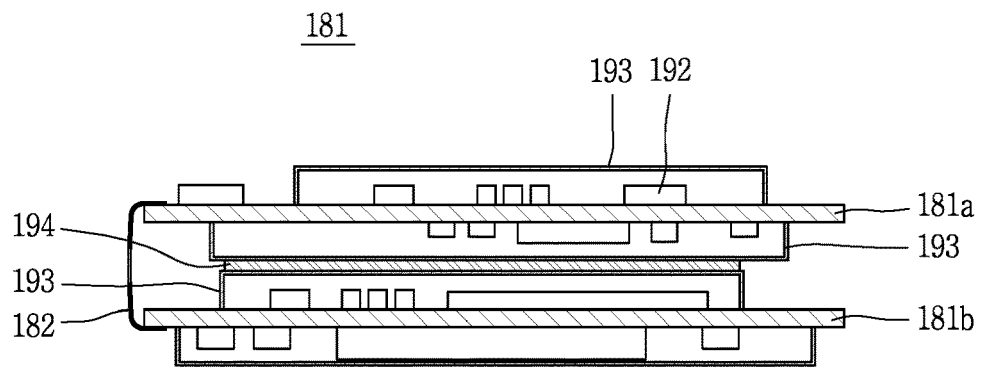
FIG. 12 is a perspective view illustrating a circuit board according to an embodiment of the present disclosure.
Figure 13:
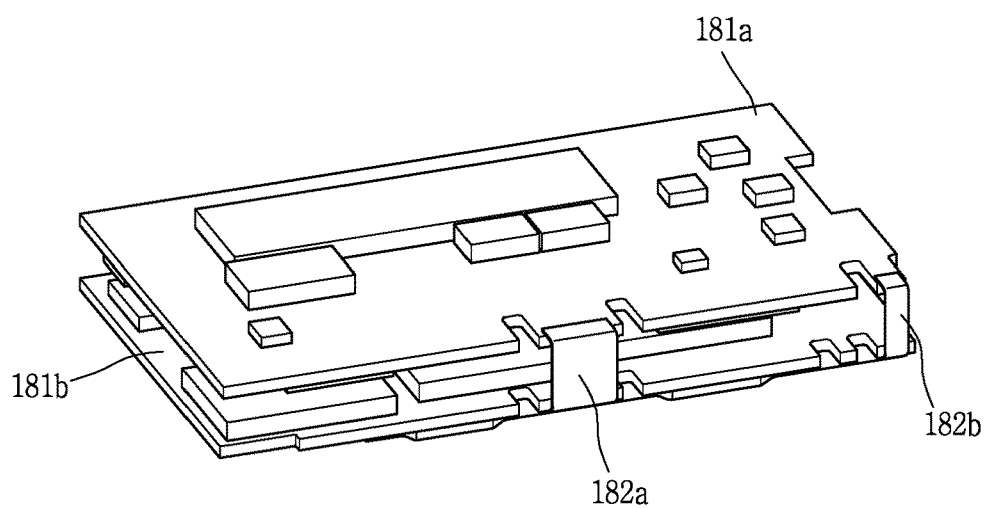
FIG. 13 is a cross-sectional view illustrating a circuit board according to an embodiment of the present disclosure.

FIG. 5 is a view illustrating a shape of an antenna 150 connected to a circuit board 181 according to an embodiment of the present disclosure, and FIG. 12 is a perspective view illustrating the circuit board 181 according to an embodiment of the present disclosure, and FIG. 13 is a cross-sectional view illustrating the circuit board 181 according to an embodiment of the present disclosure. Hereinafter the circuit board 181 according to an embodiment of the present disclosure will be described with reference to FIGS. 5, 12 and 13.

As described above, the circuit board 181 is provided on one surface of the middle frame 142, the circuit board 181 is formed by depositing two or more sub-circuit boards 181a, 181b, and the sub-circuit boards 181a, 181b are electrically connected to each other by a flexible printed circuit board in at least one region. The circuit board 181 may be provided in the upper space 140a of the frame 140, in which the two sub-circuit boards 181a, 181b are connected to each other to maximize the mounting area. Here, when the sub-circuit boards 181a, 181b are individually used, they may be used similarly to a typical circuit board 181, and according to an embodiment of the present disclosure, the electronic components 192 are mounted on at least one surface of the sub-circuit boards 181a, 181b, and shield members 193 for blocking electromagnetic waves due to electronic components are formed to cover the electronic components 192. As illustrated in FIG. 12, the sub-circuit boards 181a, 181b are separated from each other by a predetermined distance, and the shield members 193 are disposed to face each other. A shock absorbing member 194 is provided between the shield members 193 adjacent to each other, and the shield members 193 are brought into contact with each other to alleviate a frictional force or shock that occurs. The shock absorbing member 194 has a pad shape, and may be an insulating material.

When the two sub-circuit boards 181a, 181b are referred to as a first and a second sub-circuit board 181a, 181b, the first and the second sub-circuit board 181a, 181b are connected to each other by a flexible printed circuit board 182. Furthermore, as illustrated in FIG. 13, the first and the second sub-circuit board 181a, 181b may be connected to the first and the second sub-circuit board 181a, 181b at least two places by a first and a second sub-circuit board 182a, 182b.

On the other hand, a contact terminal 154a is provided on the circuit board 181, and connected to a feeding terminal 154b provided on the antenna 150 illustrated in FIGS. 3 and 5. The feeding terminal 154b is formed on a protruding portion protruded from the middle frame 142, and the feeding terminal 154b is electrically connected to the circuit board 181 through the contact terminal 154a. The contact terminal 154a may be a Pogo pin or C-clip, and may be an EMI sheet, and may not be particularly limited as far as it is electrically connected by contact.

As described above, the upper frame 144 coupled to the plate 143 and first recess portion 141 while covering the circuit board 181 is formed at an upper side of the circuit board 181, and the third recess portion 144a is formed on one surface of the upper frame 144, and the flexible printed circuit board 144b is formed on the third recess portion 144a, and the audio input module 161 is connected to an end portion of the flexible printed circuit board 144b, and one or more domes 144c are provided on one surface of the flexible printed circuit board 144b, and the button 111 is formed in a region corresponding to the dome 144c on an inner surface of the body 110. At least part of the flexible printed circuit board 144b is surrounded by the upper frame 144.

Hereinafter, the first cover 120 and second cover 130 covering a front and a rear surface of the body 110 will be described. The first cover 120 may be referred to as a front cover since it covers a front surface of the body 110, and the second cover 130 may be referred to as a rear cover since it covers a rear surface of the body 110.

Figure 10:
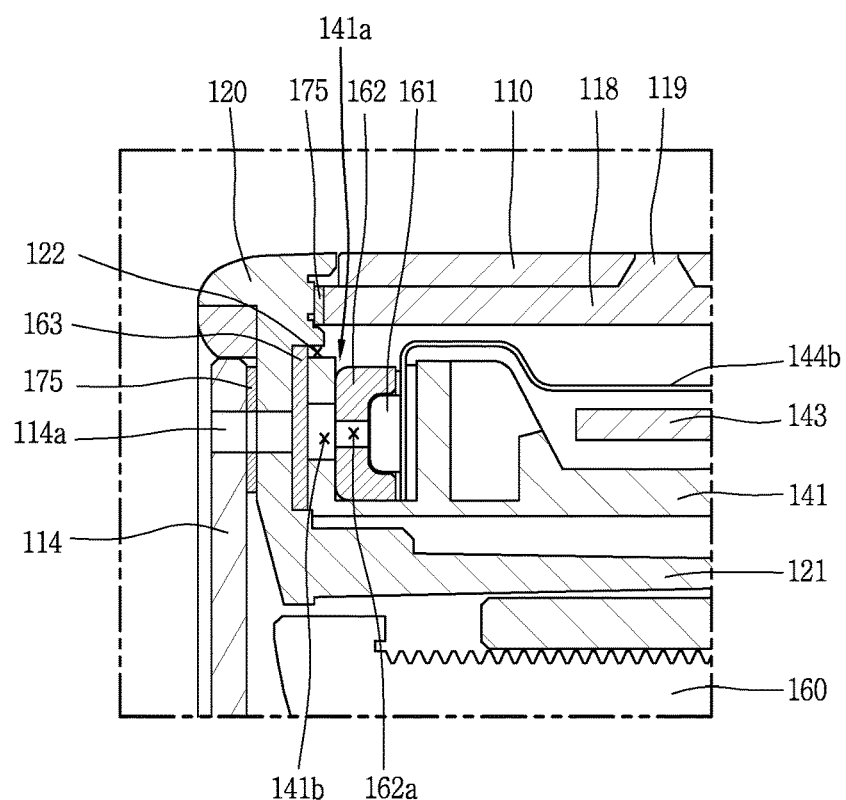
FIG. 10 is an enlarged cross-sectional view illustrating portion "C" in FIG. 2.
Figure 11:
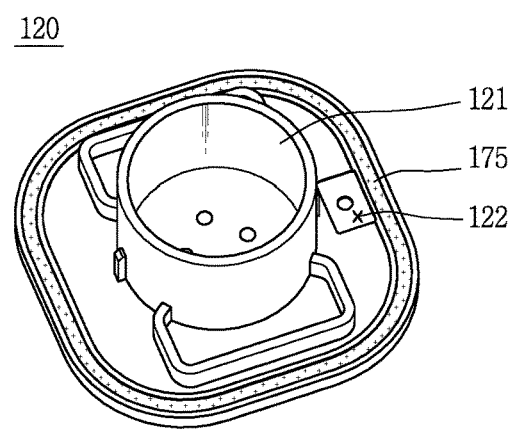
FIG. 11 is a perspective view in which a first cover according to an embodiment of the present disclosure is seen from an inside perspective.

FIG. 10 is an enlarged cross-sectional view illustrating portion "C" in FIG. 2, and FIG. 11 is a perspective view in which the first cover 120 according to an embodiment of the present disclosure is seen from an inside perspective. Referring to FIGS. 2, 10 and 11, a lens accommodation portion 121 protruded toward the lens assembly 160 is formed on an inner surface of the first cover 120, and the lens accommodation portion 121 has a shape corresponding to the lens assembly 160, and for an example, it is illustrated to have a cylindrical shape. The lens accommodation portion 121 is extended toward an inside of the body 110 from an inner surface of the first cover 120, and the first cover 120 may be coupled to the body 110 by an adhesive tape adhesive tape 175. The adhesive tape 175 is formed along an edge of the inner surface of the first cover 120, and a waterproof member accommodation portion 122 into which a third waterproof member 163 is inserted is formed in a recessed shape between the lens accommodation portion 121 and the adhesive tape 175. The waterproof structure will be described later.

Figure 6A:
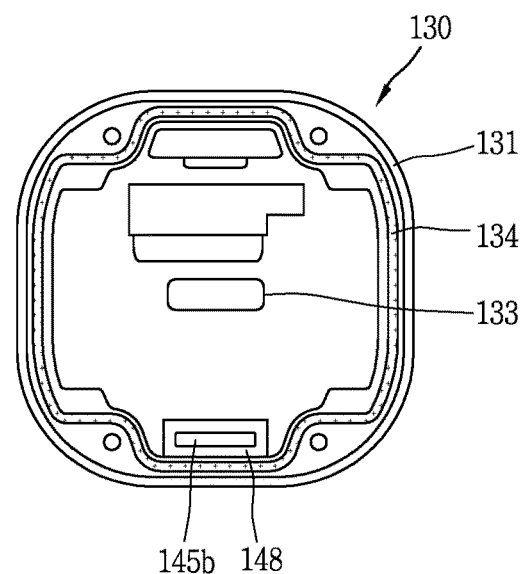
FIG. 6A is a view in which a second cover according to an embodiment of the present disclosure is seen from an inside perspective.
Figure 6B:
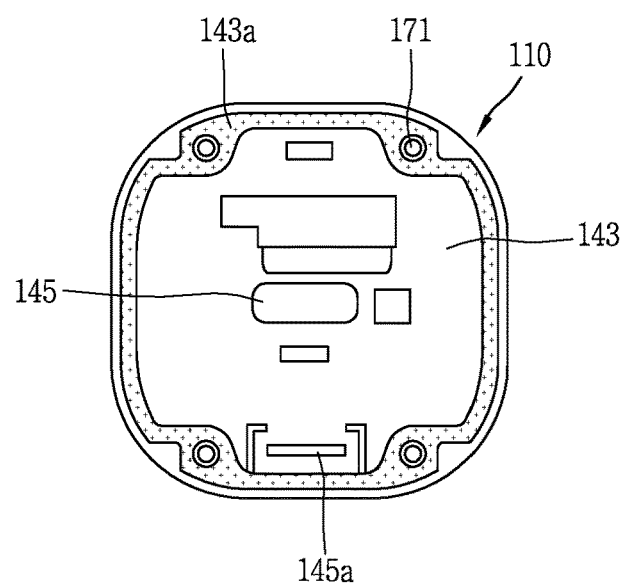
FIG. 6B is a view in which a body according to an embodiment of the present disclosure is seen from an outside perspective.
Figure 6C:
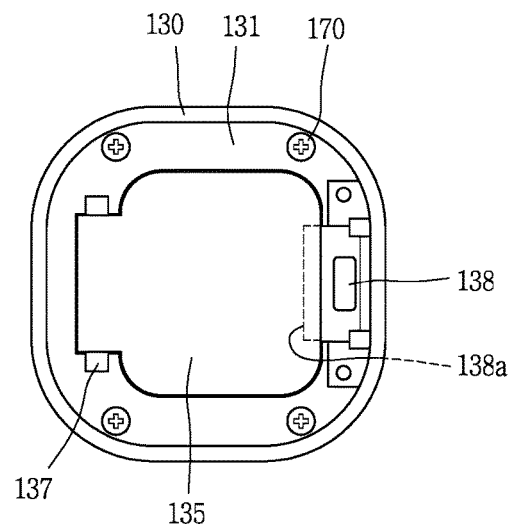
FIG. 6C is a view in which a configuration in which a second cover according to an embodiment of the present disclosure covers a rear surface of the body is seen in a rear side.
Figure 7:
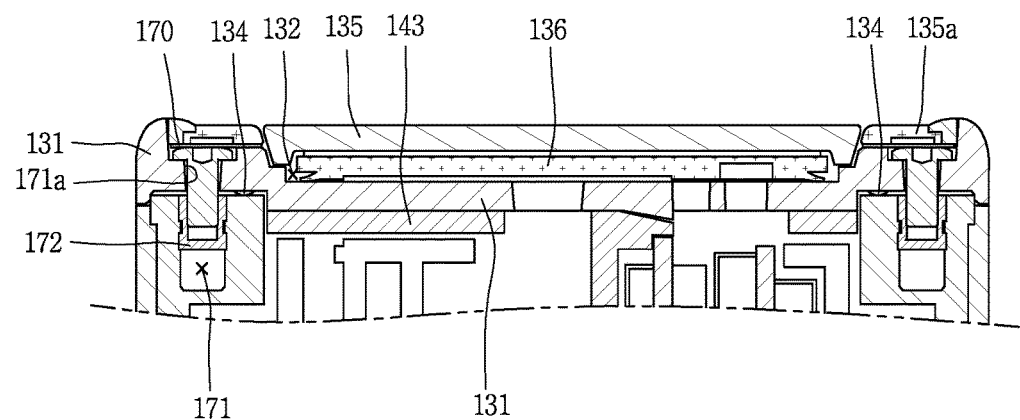
FIG. 7 is an enlarged view illustrating portion "B" in FIG. 2.
Figure 8:
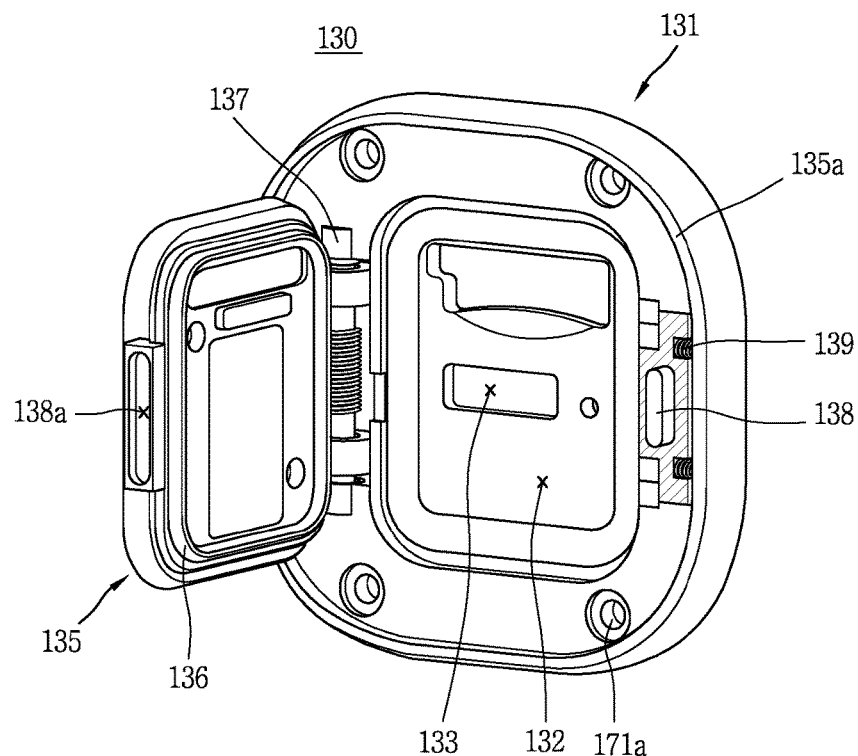
FIG. 8 is a perspective view illustrating a second cover including a cap portion according to an embodiment of the present disclosure.

On the other hand, FIG. 6A is a view in which the second cover 130 according to an embodiment of the present disclosure is seen from an inside perspective, and FIG. 6B is a view in which the body 110 according to an embodiment of the present disclosure is seen from an outside perspective, and FIG. 6C is a view in which a configuration in which the second cover 130 according to an embodiment of the present disclosure covers a rear surface of the body 110 is seen in a rear side. In other words, a surface illustrated in FIG. 6A and a surface illustrated in FIG. 6B are surfaces facing to each other, and the second cover 130 is coupled to the body 110 by a screw 170 or adhesive tape 175 (including an adhesive agent). Furthermore, FIG. 7 is an enlarged view illustrating portion "B" in FIG. 2, and FIG. 8 is a perspective view illustrating the second cover 130 including a cap portion 135 according to an embodiment of the present disclosure.

Hereinafter, the present disclosure will be described with reference to FIGS. 6A through 8.

The second cover 130 according to an embodiment of the present disclosure may include a fastening portion 131 in a plate shape fastened to the body 110 and provided with a second recess portion recessed toward in an inward direction of the body 110, and a cap portion 135, one side of which is rotatably coupled to the fastening portion 131 to open or close the second recess portion 132. The fastening portion 131 has a shape corresponding to a cross-section of the body 110, and the second recess portion 132 recessed toward the body 110 is formed at a central portion thereof, and the cap portion 135 is coupled to one side of the second recess portion 132 to open or close the second recess portion 132.

An identification module may be inserted into the plate 143, and the identification module as a chip stored with various information for authenticating the use authority of the image capturing apparatus 100, may include a user identify module (UIM), a subscriber identity module (SIM), a universal subscriber identity module (USIM), and the like. A device (hereinafter, "identification device") provided with the identification module may be fabricated in a smart card type. Accordingly, the identification device may be connected to the terminal 200 through the interface unit.

For example, a secure digital (SD) card or SIM card may be inserted into a plurality of through holes 145, 145a formed on the plate 143, and may be a USB port (interface unit). A plurality of through holes 133, 145b communicating with the plurality of through holes 145, 145a formed on the plate 143 are formed on the second recess portion 132, an SD card or SIM card may be inserted thereinto in a state that the cap portion 135 is open, and may be used as a USB port for charging or data transmission.

Hereinafter, the waterproof structure of the image capturing apparatus 100 according to an embodiment of the present disclosure will be described. The waterproof structure may be essentially required when the image capturing apparatus 100 according to an embodiment of the present disclosure is used outdoor. However, as described above, when the cap portion 135 is open to insert a SD card or SIM card into the body 110 or charge using a USB port, the cap portion 135 should be open or closed. A waterproof structure for disallowing water from being infiltrated into the body 110 is required while opening or closing the cap portion 135.

First, referring to FIGS. 7 and 8, a first waterproof member 136 formed in close contact with the second recess portion 132 to seal the through hole 133 formed on the second recess portion 132 is formed on an inner surface of the cap portion 135 facing the second recess portion 132. The first waterproof member 136 is protruded toward the second recess portion 132 to limit a region slightly smaller than that corresponding to the region of the second recess portion 132. In other words, a region of the first waterproof member 136 is formed to be larger than that including the through hole 133 to prevent water from being infiltrated through the through hole 133 formed on the second recess portion 132 The first waterproof member 136 may be rubber, and will be sufficient as far as it is an elastic waterproof material.

The image capturing apparatus 100 is primarily waterproofed by the first waterproof member 136.

Furthermore, referring to FIGS. 6A and 7, a second waterproof member 134 for limiting an area larger than that of the cap portion 135 is formed on an inner surface of the second cover 130, namely, a surface facing the body 110. The first waterproof member 136 may be rubber, and formed by a dispensing method. In other words, the second waterproof member 134 formed in close contact with the plate 143 to seal a plurality of through holes 145, 145b formed on the plate 143 is formed on an inner surface of the fastening portion 131 facing the plate 143. The second waterproof member 134 is closely adhered to a waterproof member forming region 143a formed on the plate 143 as illustrated in FIG. 6B.

Water that can be introduced into a gap between the body 110 and the second cover 130 may be blocked by the second waterproof member 134. In other words, the image capturing apparatus 100 is secondarily waterproofed by the second waterproof member 134.

Furthermore, referring to FIGS. 2 an 10, the first recess portion 141 has a shape corresponding to the lens assembly 160, and an audio input module accommodation portion 141a into which the audio input module 161 is accommodated is provided on an outer circumferential surface of the first recess portion 141, and the third waterproof member 163 is provided between the audio input module accommodation portion 141a and an inner surface of the first cover 120. The third waterproof member 163, which is a Gore-Tex material, is a material for allowing air to pass therethrough but blocking water. In other words, an audio input hole 114a is formed on the window 114 to record external audio by the audio input module 161, and audio that has passed through the audio input hole 114a should be introduced up to the audio input module 161, and for the purpose of this, the third waterproof member 163 should be a material for allowing audio to pass therethrough. Furthermore, a rubber member 162 for surrounding the audio input module 161 may be provided in the audio input module accommodation portion 141a, thereby preventing the damage of the audio input module 161 due to a direct contact between the audio input module 161 and the audio input module accommodation portion 141a. In other words, the rubber member 162 performs a function of alleviating shock applied to the audio input module 161. The rubber member 162 may perform a waterproof function, but does not allow audio to pass therethrough, and thus has a more advantage in alleviating shock. Furthermore, the rubber member 162 is not allowed to block audio that has passed through the audio input hole 114a, and hole 162a should be formed thereon, and a hole 141b (refer to FIG. 3) should be also formed at the audio input module accommodation portion 141a to communicate with the audio input hole 114a. In other words, the present disclosure is disposed in the order of the rubber member 162, audio input module accommodation portion 141a, third waterproof member 163, first cover 120, adhesive tape 175 and window 114 toward an outside from the audio input module 161. Here, an audio input path is formed to communicate by the rubber member 162, audio input module accommodation portion 141a, first cover 120, adhesive tape 175 and window 114.

The image capturing apparatus 100 may be waterproofed in a threefold manner by the third waterproof member 163.

As illustrated in FIGS. 10 and 11, the waterproof member accommodation portion 122 in which the third waterproof member 163 is accommodated is formed at an inner surface of the first cover 120, and the light guide member 118 and an inner surface of the first cover 120 may be coupled to each other by the adhesive tape 175.

On the other hand, referring to FIG. 7, a screw hole 171a, 171b is formed on a outer surface of the body 110, and a screw insert 172 is provided in the screw hole 171a, 171b, and the screw 170 is fastened to the screw insert 172, thereby sealing a portion at which the body 110 is fastened to the first cover 120 or second cover 130. In FIG. 7, the sealing of a portion fastened to the second cover 130 is mainly illustrated, but the present disclosure may not be necessarily limited to this, the structure of the screw insert 172 may be introduced to seal a portion at which the first cover 120 is fastened to the body 110.

In this manner, water introduced into a gap between the body 110 and the second cover 130 may be blocked by the structure of the screw insert 172. The image capturing apparatus 100 is waterproofed in a fourfold manner by the structure of the screw insert 172. If there is water introduced through the structure of the screw insert 172, the water introduced into the frame 140 may be blocked by the second waterproof member 134.

Here, the screw hole 171a formed on the fastening portion 131 and the screw hole 171 formed on the body 110 are communicated with each other, and thus the screw 170 is inserted thereinto, and the screw insert 172 may be formed at only part of an upper side of the screw hole 171 formed on the body 110.

On the other hand, according to an embodiment of the present disclosure, as illustrated in FIGS. 6A and 6B, an audio output hole 145a is formed on the plate 143, and a through hole 145b is also formed on the fastening portion 131 to transfer audio outputted through the audio output hole 145a to an outside, and a fifth waterproof member 148 with a Gore-Tex material capable of allowing audio to pass through the through hole 145b but blocking water therethrough.

Figure 9:
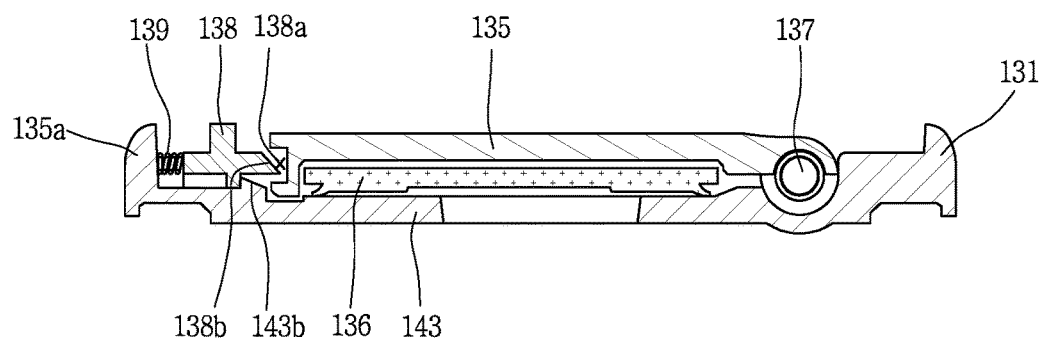
FIG. 9 is a view for explaining the switching operation of a cap portion and a fastening portion according to an embodiment of the present disclosure.

Hereinafter, FIG. 8 is a perspective view illustrating the second cover 130 according to an embodiment of the present disclosure, and FIG. 9 is a view for explaining the switching operation of the cap portion 135 and fastening portion 131 according to an embodiment of the present disclosure, which is a partially cross-sectional view of the second cover 130.

Referring to FIGS. 8 and 9, the second recess portion 132 if formed on the fastening portion 131, and a fringe 135a protruded toward a length direction of the image capturing apparatus 100, namely, in an outward direction, is formed at an edge of the fastening portion 131. In other words, the fringe 135a is protruded toward an outside along an edge of the fastening portion 131 on the fastening portion 131.

Part of the cap portion 135 is fixed to the fastening portion 131 by a hinge axis 137 in an outer region of the second recess portion 132, and the cap portion 135 rotates around the hinge axis 137 to open or close the second recess portion 132. In other words, the cap portion 135 is coupled to or separated from the fastening portion 131 by a switching operation through the rotation of the cap portion 135. A button portion 138 is provided in a region between the second recess portion 132 and the fringe 135a as a mechanism for rotating the cap portion 135, and an elastic member 139 for providing an elastic force to the button portion 138 is provided between the button portion 138 and the fringe 135a. In other words, the button portion 138 is provided on an outer surface of the fastening portion 131, and the button portion 138 is accommodated into a button groove 138a formed at a lateral surface of the cap portion 135, and the elastic member 139 for providing an elastic force to the button portion 138 is provided between the fringe 135a and the button portion 138. The cross section of the button groove 138a has a substantial "C" or "t"-shape, and part of the button portion 138 is inserted thereinto. In other words, when the button portion 138 is drawn toward the fringe 135a, a protruded portion 138b of the button portion 138 is escaped from the button groove 138a, and the cap portion 135 is released from the button portion 138, and the movement of the button portion 138 is limited by a stepped protrusion 143b formed on the plate 143. Here, the protruding portion 138b is inclined toward an inner side of the body, and when the cap portion 135 is rotated in a state that the cap portion 135 is open, the cap portion 135 will be closed while being slid to the protruding portion 138b.

Hereinafter, the embodiment of the image capturing apparatus 100 according to an embodiment of the present disclosure will be described.

The image capturing apparatus 100 performs a function of capturing a still image or video and storing it in an SD card (memory card) or transmitting it to the mobile terminal 200 or server 300.

Figure 14A:
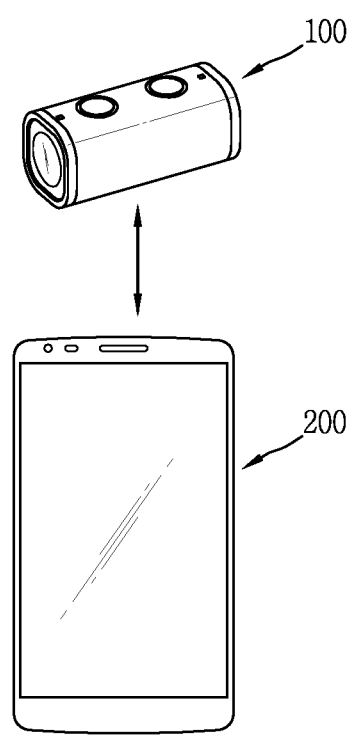
FIGS. 14A and 14B are views for explaining an embodiment of an image capturing apparatus according to an embodiment of the present disclosure.
Figure 14B:
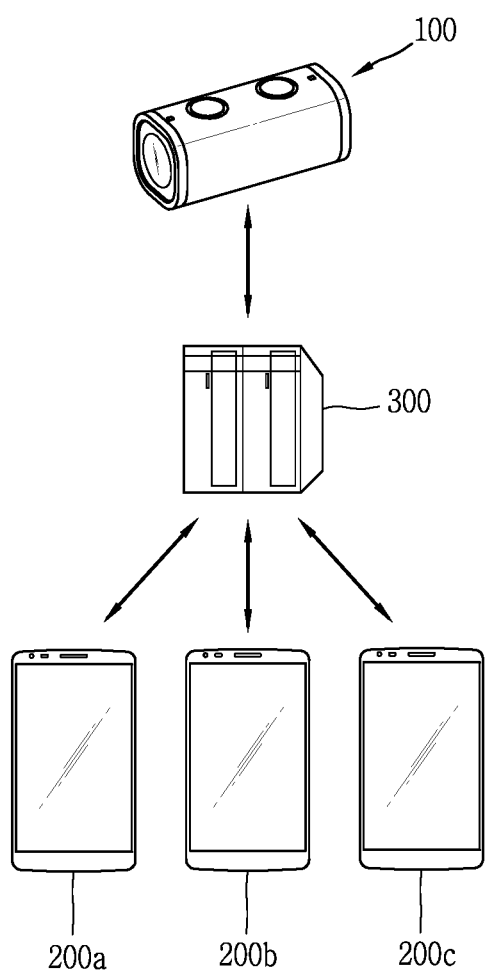

FIGS. 14A and 14B are views for explaining an embodiment of an image capturing apparatus 100 according to an embodiment of the present disclosure, in which FIG. 14A is an embodiment of carrying out direct image transmission between the image capturing apparatus 100 and the mobile terminal 200, and FIG. 14B is an embodiment for explaining that an image stored in the server 300 is seen by a plurality of users through a plurality of mobile terminals 200a, 200b, 200c.

According to a mode illustrated in FIG. 14A, a user may obtain image information by checking the image information obtained by the image capturing apparatus 100 through Wireless Fidelity (WiFi), Long Term Evolution (LTE) or Long Term Evolution-Advanced (LTE-A) in real time. To this end, a wireless communication unit 210 (refer to FIG. 16) should be provided in the image capturing apparatus 100 and mobile terminal 200, and herein the foregoing antenna 150 may be functioned as an antenna 150 for wireless communication.

Furthermore, as illustrated in FIG. 14B, it may be used in a form in which image information obtained by the image capturing apparatus 100 through Long Term Evolution (LTE), Long Term Evolution-Advanced (LTE-A) or the like is stored in the server 300, and a plurality of mobile terminals 200a, 200b, 200c access the server 300 to download the image information stored in the server 300. To this end, the antenna 150 capable of implementing a frequency with a LTE bandwidth should be provided, and according to an embodiment of the present disclosure, the first through the third antenna 151, 152, 153 are disposed therein to implement this. In other words, a resonant frequency with various bandwidths may be implemented by the first through the third antenna 151, 152, 153, and the image information may be more quickly stored in the server 300. In this manner, when the server 300 is used, a plurality of users may obtain image information captured by the image capturing apparatus 100 at the same time.

Figure 15A:
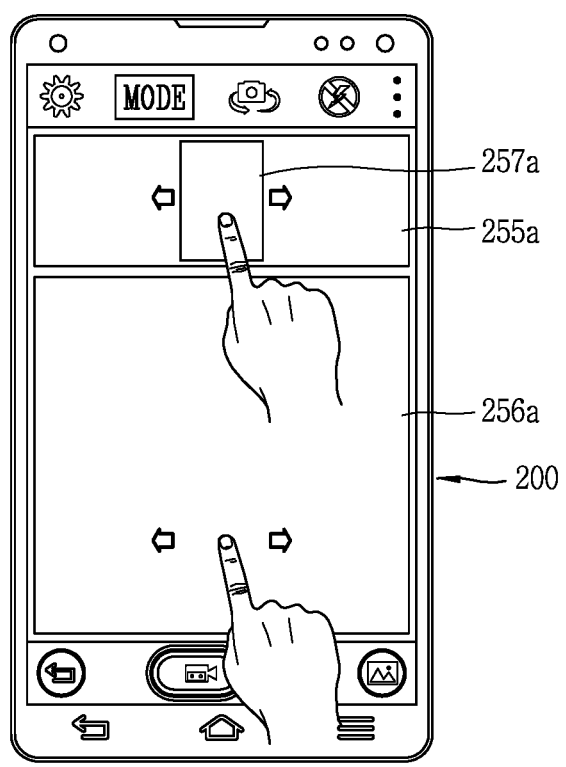
FIGS. 15A and 15B are exemplary views illustrating a capture mode according to an embodiment of the present disclosure.
Figure 15B:
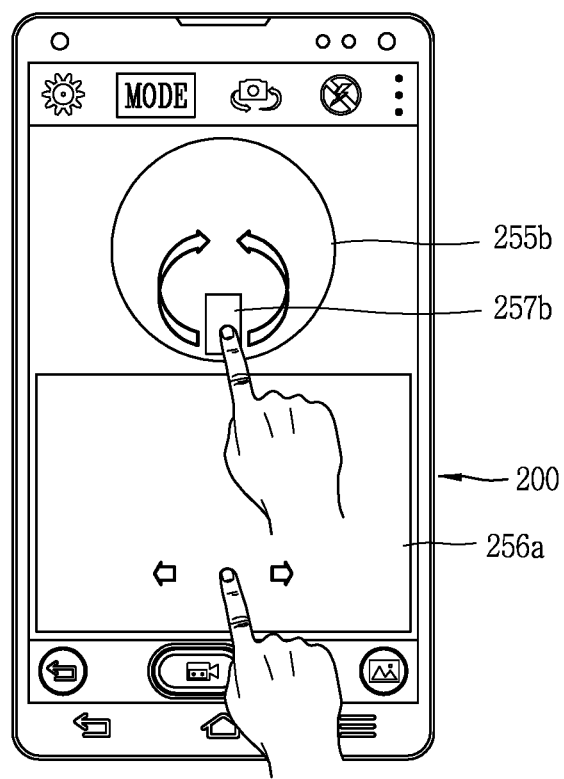

On the other hand, FIGS. 15A and 15B are exemplary views illustrating a capture mode according to an embodiment of the present disclosure, which is a view for explaining that a user checks captured images in real time. Referring to FIGS. 15A and 15B, when the mobile terminal 200 and the image capturing apparatus 100 are connected by wired or wireless communication, a camera application in the mobile terminal 200 automatically executes a camera mode, and displays the display unit of the mobile terminal 200 divided into a first display unit 255a and a second display unit 256a. In FIG. 15A, it is illustrated that the entire image captured by a user is displayed in the first display unit 255a, and a predetermined region of the first display unit 255a is enlarged and displayed in the second display unit 256a. Here, the first display unit 255a may be formed in an elongated manner in a transverse direction as in a panorama mode, and a region desired to be enlarged by the user may be divided from another portion by a guide 257a, and the guide 257a may be displayed in a rectangular box shape.

Furthermore, the image capturing apparatus 100 according to an embodiment of the present disclosure may be a type of action camera, and when captured while moving or stopping, image information obtained by the image capturing apparatus 100 may be displayed in a spherical shape (sphere view, planar view) on the first display unit 255a as illustrated in FIG. 15B, and allowed for a user to view a specific region while rotating it. Even at this time, for a region desired to be enlarged by the user, a specific region of the first display unit 255a may be distinguished from another region by the guide 257b.

Moreover, according to an embodiment of the present disclosure, a snap shot may be taken while shooting a video in a capture mode by the image capturing apparatus 100. For example, image information captured by the image capturing apparatus 100 may be displayed on the first display unit 255a, 255b, and an object (not shown) indicating a snap shot of the mobile terminal 200 may be touched at a specific time point to obtain an image at a specific time point of the video being shot. It may be also allowed even in case where the video is being played back on the mobile terminal 200. At this time, a snap shot image captured on the first display unit 255a, 255b may be displayed on the second display unit 256a, 256b.

Here, when an image is displayed on the first display unit 255a, 255b, as illustrated in FIGS. 15A and 15B, a screen may be displayed in an elongated manner toward one direction as in a panorama mode or a spherical shaped screen may be displayed to give a three-dimensional feeling.

Hereinafter, the mobile terminal 200 according to an embodiment of the present disclosure will be described.

Mobile terminals described herein may include cellular phones, smart phones, laptop computers, digital broadcasting terminals, personal digital assistants (PDAs), portable multimedia players (PMPs), navigators, slate PCs, tablet PCs, ultra books, wearable devices (for example, smart watches, smart glasses, head mounted displays (HMDs)), and the like.

However, it may be easily understood by those skilled in the art that the configuration according to the exemplary embodiments of this specification can also be applied to stationary terminals such as digital TV, desktop computers and the like, excluding a case of being applicable only to the mobile terminals.

Figure 16:
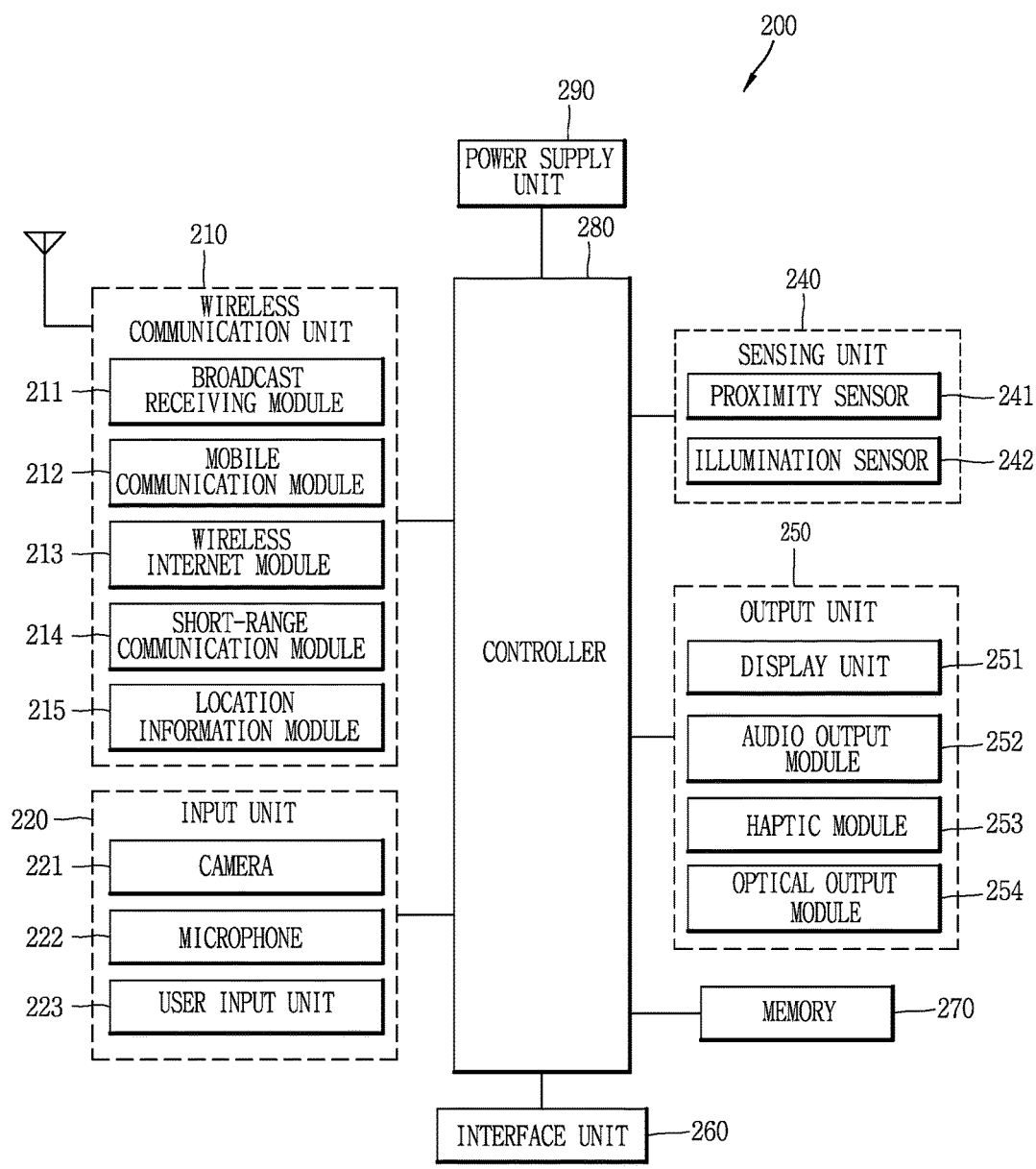
FIG. 16 is a block diagram illustrating a mobile terminal associated with an embodiment of the present disclosure.

Referring to FIG. 16, FIG. 16 is a block diagram illustrating a mobile terminal associated with an embodiment of the present disclosure.

The mobile terminal 200 may include components, such as a wireless communication unit 210, an input unit 220, a sensing unit 240, an output unit 250, an interface unit 260, a memory 270, a controller 280, a power supply unit 290 and the like. FIG. 16 illustrates the mobile terminal having various components, but it may be understood that implementing all of the illustrated components is not a requirement. Greater or fewer components may alternatively be implemented.

In more detail, the wireless communication unit 210 of those components may typically include one or more modules which permit wireless communications between the mobile terminal 200 and a wireless communication system, between the mobile terminal 200 and another mobile terminal 200, or between the mobile terminal 200 and a network within which another mobile terminal 200 (or an external server) is located.

For example, the wireless communication unit 210 may include at least one of a broadcast receiving module 211, a mobile communication module 212, a wireless Internet module 213, a short-range communication module 214, a location information module 215 and the like.

The input unit 220 may include a camera 221 for inputting an image signal, a microphone 222 or an audio input module for inputting an audio signal, or a user input unit 223 (for example, a touch key, a push key (or a mechanical key), etc.) for allowing a user to input information. Audio data or image data collected by the input unit 220 may be analyzed and processed by a user's control command.

The sensing unit 240 may include at least one sensor which senses at least one of internal information of the mobile terminal, a surrounding environment of the mobile terminal and user information. For example, the sensing unit 240 may include a proximity sensor 241, an illumination sensor 242, a touch sensor, an acceleration sensor, a magnetic sensor, a G-sensor, a gyroscope sensor, a motion sensor, an RGB sensor, an infrared (IR) sensor, a finger scan sensor, a ultrasonic sensor, an optical sensor (for example, refer to the camera 221), a microphone 222, a battery gage, an environment sensor (for example, a barometer, a hygrometer, a thermometer, a radiation detection sensor, a thermal sensor, a gas sensor, etc.), and a chemical sensor (for example, an electronic nose, a health care sensor, a biometric sensor, etc.). On the other hand, the mobile terminal disclosed herein may utilize information in such a manner of combining information sensed by at least two sensors of those sensors.

The output unit 250 may be configured to output an audio signal, a video signal or a tactile signal. The output unit 250 may include a display unit 251, an audio output module 252, a haptic module 253, an optical output module 254 and the like. The display unit 251 may have an inter-layered structure or an integrated structure with a touch sensor so as to implement a touch screen. The touch screen may provide an output interface between the mobile terminal 200 and a user, as well as functioning as the user input unit 223 which provides an input interface between the mobile terminal 200 and the user.

The interface unit 260 may serve as an interface with various types of external devices connected with the mobile terminal 200. The interface unit 260, for example, may include wired or wireless headset ports, external power supply ports, wired or wireless data ports, memory card ports, ports for connecting a device having an identification module, audio input/output (I/O) ports, video I/O ports, earphone ports, or the like. The mobile terminal 200 may execute an appropriate control associated with a connected external device, in response to the external device being connected to the interface unit 260.

The memory 270 may store a plurality of application programs (or applications) executed in the mobile terminal 200, data for operations of the mobile terminal 200, instruction words, and the like. At least some of those application programs may be downloaded from an external server via wireless communication. Some others of those application programs may be installed within the mobile terminal 200 at the time of being shipped for basic functions of the mobile terminal 200 (for example, receiving a call, placing a call, receiving a message, sending a message, etc.). On the other hand, the application programs may be stored in the memory 270, installed in the mobile terminal 200, and executed by the controller 280 to perform an operation (or a function) of the mobile terminal 200.

The controller 280 may typically control an overall operation of the mobile terminal 200 in addition to the operations associated with the application programs. The controller 280 may provide or process information or functions appropriate for a user in a manner of processing signals, data, information and the like, which are input or output by the aforementioned components, or activating the application programs stored in the memory 270.

The controller 280 may control at least part of the components illustrated in FIG. 16, in order to drive the application programs stored in the memory 270. In addition, the controller 280 may drive the application programs by combining at least two of the components included in the mobile terminal 200 for operation.

The power supply unit 290 may receive external power or internal power and supply appropriate power required for operating respective elements and components included in the mobile terminal 200 under the control of the controller 280. The power supply unit 290 may include a battery, and the battery may be an embedded battery or a replaceable battery.

At least part of those elements and components may be combined to implement operation and control of the mobile terminal or a control method of the mobile terminal according to various exemplary embodiments described herein. Also, the operation and control or the control method of the mobile terminal may be implemented in the mobile terminal in such a manner of activating at least one application program stored in the memory 270.

Hereinafter, each aforementioned component will be described in more detail with reference to FIG. 16, prior to explaining various exemplary embodiments implemented by the mobile terminal 200 having the configuration.

First, the wireless communication unit 210 will be described. The broadcast receiving module 211 of the wireless communication unit 210 may receive a broadcast signal and/or broadcast associated information from an external broadcast managing entity via a broadcast channel. The broadcast channel may include a satellite channel and a terrestrial channel. At least two broadcast receiving modules 211 may be provided in the mobile terminal 200 to simultaneously receive at least two broadcast channels or switch the broadcast channels.

The mobile communication module 212 may transmit/receive wireless signals to/from at least one of network entities, for example, a base station, an external mobile terminal, a server, and the like, on a mobile communication network, which is constructed according to technical standards or transmission methods for mobile communications (for example, Global System for Mobile communication (GSM), Code Division Multi Access (CDMA), Code Division Multi Access 2000 (CDMA2000), Enhanced Voice-Data Optimized or Enhanced Voice-Data Only (EV-DO), Wideband CDMA (WCDMA), High Speed Downlink Packet Access (HSDPA), High Speed Uplink Packet Access (HSUPA), Long Term Evolution (LTE), Long Term Evolution-Advanced (LTE-A), etc.)

Here, the wireless signals may include audio call signal, video (telephony) call signal, or various formats of data according to transmission/reception of text/multimedia messages.

The wireless Internet module 213 denotes a module for wireless Internet access. This module may be internally or externally coupled to the mobile terminal 200. The wireless Internet module 213 may transmit/receive wireless signals via communication networks according to wireless Internet technologies.

Examples of such wireless Internet access may include Wireless LAN (WLAN), Wireless-Fidelity (Wi-Fi), Wireless Fidelity Direct (Wi-Fi Direct), Digital Living Network Alliance (DLNA), Wireless Broadband (WiBro), World Interoperability for Microwave Access (WiMAX), High Speed Downlink Packet Access (HSDPA), High Speed Uplink Packet Access (HSUPA), LTE (Long Term Evolution), LTE-A (Long Term Evolution-Advanced), and the like. The wireless Internet module 213 may transmit/receive data according to at least one wireless Internet technology within a range including even Internet technologies which are not aforementioned.

From the perspective that the wireless Internet accesses according to Wibro, HSDPA, GSM, CDMA, WCDMA, LTE, LTE-A and the like are executed via a mobile communication network, the wireless Internet module 213 which performs the wireless Internet access via the mobile communication network may be understood as a type of the mobile communication module 212.

The short-range communication module 214 denotes a module for short-range communications. Suitable technologies for implementing the short-range communications may include BLUETOOTH™, Radio Frequency IDentification (RFID), Infrared Data Association (IrDA), Ultra-WideBand (UWB), ZigBee, Near Field Communication (NFC), Wireless-Fidelity (Wi-Fi), Wi-Fi Direct, Wireless Universal Serial Bus (Wireless USB) and the like. The short-range communication module 214 may support wireless communications between the mobile terminal 200 and a wireless communication system, between the mobile terminal 200 and another mobile terminal 200, or between the mobile terminal and a network where another mobile terminal 200 (or an external server) is located, via wireless personal area networks.

Here, the another mobile terminal 200 may be a wearable device, for example, a smart watch, a smart glass or a head mounted display (HMD), which is able to exchange data with the mobile terminal 200 (or to cooperate with the mobile terminal 200). The short-range communication module 214 may sense (recognize) a wearable device, which is able to communicate with the mobile terminal), near the mobile terminal 200. In addition, when the sensed wearable device is a device which is authenticated to communicate with the mobile terminal 200 according to the present disclosure, the controller 280 may transmit at least part of data processed in the mobile terminal 200 to the wearable device via the short-range communication module 214. Hence, a user of the wearable device may use the data processed in the mobile terminal 200 on the wearable device. For example, when a call is received in the mobile terminal 200, the user may answer the call using the wearable device. Also, when a message is received in the mobile terminal 200, the user may check the received message using the wearable device.

The location information module 215 denotes a module for detecting or calculating a position of the mobile terminal. An example of the location information module 215 may include a Global Position System (GPS) module or a Wi-Fi module. For example, when the mobile terminal uses the GPS module, a position of the mobile terminal may be acquired using a signal sent from a GPS satellite. As another example, when the mobile terminal uses the Wi-Fi module, a position of the mobile terminal may be acquired based on information related to a wireless access point (AP) which transmits or receives a wireless signal to or from the Wi-Fi module. According to the need, the location information module 215 may perform any function of the other modules of the wireless communication unit 210 to obtain data on the location of the mobile terminal. As a module used to acquire the location (or current location) of the mobile terminal, the location information module 215 may not be necessarily limited to a module for directly calculating or acquiring the location of the mobile terminal.

Hereinafter, the input unit 220 will be described in more detail. The input unit 220 may be configured to provide an audio or video signal (or information) input to the mobile terminal or information input by a user to the mobile terminal. For the input of the audio information, the mobile terminal 200 may include one or a plurality of cameras 221. The camera 221 may process image frames of still pictures or video obtained by image sensors in a video call mode or a capture mode. The processed image frames may be displayed on the display unit 251. On the other hand, the plurality of cameras 221 disposed in the mobile terminal 200 may be arranged in a matrix configuration. By use of the cameras 221 having the matrix configuration, a plurality of image information having various angles or focal points may be input into the mobile terminal 200. Also, the plurality of cameras 221 may be arranged in a stereoscopic structure to acquire a left image and a right image for implementing a stereoscopic image.

The microphone 222 may process an external audio signal into electric audio data. The processed audio data may be utilized in various manners according to a function being executed in the mobile terminal 200 (or an application program being executed). On the other hand, the microphone 222 may include assorted noise removing algorithms to remove noise generated in the course of receiving the external audio signal.

The user input unit 223 may receive information input by a user. When information is input through the user input unit 223, the controller 280 may control an operation of the mobile terminal 200 to correspond to the input information. The user input unit 223 may include a mechanical input element (or a mechanical key, for example, a button located on a front/rear surface or a side surface of the mobile terminal 200, a dome switch, a jog wheel, a jog switch, etc.), and a touch-sensitive input means. As one example, the touch-sensitive input means may be a virtual key, a soft key or a visual key, which is displayed on a touch screen through software processing, or a touch key which is disposed on a portion except for the touch screen. On the other hand, the virtual key or the visual key may be displayable on the touch screen in various shapes, for example, graphic, text, icon, video or a combination thereof.

The sensing unit 240 may sense at least one of internal information of the mobile terminal, surrounding environment information of the mobile terminal and user information, and generate a sensing signal corresponding to it. The controller 280 may control an operation of the mobile terminal 200 or execute data processing, a function or an operation associated with an application program installed in the mobile terminal based on the sensing signal. Hereinafter, description will be given in more detail of representative sensors of various sensors which may be included in the sensing unit 240.

First, a proximity sensor 241 refers to a sensor to sense presence or absence of an object approaching to a surface to be sensed, or an object disposed near a surface to be sensed, by using an electromagnetic field or infrared rays without a mechanical contact. The proximity sensor 241 may be arranged at an inner region of the mobile terminal covered by the touch screen, or near the touch screen. The proximity sensor 241 may have a longer lifespan and a more enhanced utility than a contact sensor.

The proximity sensor 241, for example, may include a transmissive type photoelectric sensor, a direct reflective type photoelectric sensor, a mirror reflective type photoelectric sensor, a high-frequency oscillation proximity sensor, a capacitance type proximity sensor, a magnetic type proximity sensor, an infrared rays proximity sensor, and so on. When the touch screen is implemented as a capacitance type, the proximity sensor 241 may sense proximity of a pointer to the touch screen by changes of an electromagnetic field, which is responsive to an approach of an object with conductivity. In this case, the touch screen (touch sensor) may be categorized into a proximity sensor.

Hereinafter, for the sake of brief explanation, a status that the pointer is positioned to be proximate onto the touch screen without contact will be referred to as 'proximity touch,' whereas a status that the pointer substantially comes in contact with the touch screen will be referred to as 'contact touch.' For the position corresponding to the proximity touch of the pointer on the touch screen, such position will correspond to a position where the pointer faces perpendicular to the touch screen upon the proximity touch of the pointer. The proximity sensor 241 may sense proximity touch, and proximity touch patterns (e.g., distance, direction, speed, time, position; moving status, etc.). On the other hand, the controller 280 may process data (or information) corresponding to the proximity touches and the proximity touch patterns sensed by the proximity sensor 241, and output visual information corresponding to the process data on the touch screen. In addition, the controller 280 may control the mobile terminal 200 to execute different operations or process different data (or information) according to whether a touch with respect to the same point on the touch screen is either a proximity touch or a contact touch.

A touch sensor may sense a touch (or touch input) applied onto the touch screen (or the display unit 251) using at least one of various types of touch methods, such as a resistive type, a capacitive type, an infrared type, a magnetic field type, and the like.

As one example, the touch sensor may be configured to convert changes of pressure applied to a specific part of the display unit 251 or a capacitance occurring from a specific part of the display unit 251, into electric input signals. Also, the touch sensor may be configured to sense not only a touched position and a touched area, but also touch pressure. Here, a touch object is an object to apply a touch input onto the touch sensor. Examples of the touch object may include a finger, a touch pen, a stylus pen, a pointer or the like.

When touch inputs are sensed by the touch sensors, corresponding signals may be transmitted to a touch controller. The touch controller may process the received signals, and then transmit corresponding data to the controller 280. Accordingly, the controller 280 may sense which region of the display unit 251 has been touched. Here, the touch controller may be a component separate from the controller 280 or the controller 280 itself.

On the other hand, the controller 280 may execute a different control or the same control according to a type of an object which touches the touch screen (or a touch key provided in addition to the touch screen). Whether to execute the different control or the same control according to the object which gives a touch input may be decided based on a current operating state of the mobile terminal 200 or a currently executed application program.

Meanwhile, the touch sensor and the proximity sensor may be executed individually or in combination, to sense various types of touches, such as a short (or tap) touch, a long touch, a multi-touch, a drag touch, a flick touch, a pinch-in touch, a pinch-out touch, a swipe touch, a hovering touch, and the like.

An ultrasonic sensor may be configured to recognize position information relating to a sensing object by using ultrasonic waves. The controller 280 may calculate a position of a wave generation source based on information sensed by an illumination sensor and a plurality of ultrasonic sensors. Since light is much faster than ultrasonic waves, a time for which the light reaches the optical sensor may be much shorter than a time for which the ultrasonic wave reaches the ultrasonic sensor. The position of the wave generation source may be calculated using the fact. In more detail, the position of the wave generation source may be calculated by using a time difference from the time that the ultrasonic wave reaches based on the light as a reference signal.

The camera 221 constructing the input unit 220 may be a type of camera sensor. The camera sensor may include at least one of a photo sensor and a laser sensor.

The camera 221 and the laser sensor may be combined to detect a touch of the sensing object with respect to a 3D stereoscopic image. The photo sensor may be laminated on the display device. The photo sensor may be configured to scan a movement of the sensing object in proximity to the touch screen. In more detail, the photo sensor may include photo diodes and transistors at rows and columns to scan content placed on the photo sensor by using an electrical signal which changes according to the quantity of applied light. Namely, the photo sensor may calculate the coordinates of the sensing object according to variation of light to thus obtain position information of the sensing object.

The display unit 251 may output information processed in the mobile terminal 200. For example, the display unit 251 may display execution screen information of an application program driven in the mobile terminal 200 or user interface (UI) and graphic user interface (GUI) information in response to the execution screen information.

The display unit 251 may also be implemented as a stereoscopic display unit for displaying stereoscopic images.

The stereoscopic display unit may employ a stereoscopic display scheme such as stereoscopic scheme (a glass scheme), an auto-stereoscopic scheme (glassless scheme), a projection scheme (holographic scheme), or the like.

The audio output module 252 may output audio data received from the wireless communication unit 210 or stored in the memory 260 in a call signal reception mode, a call mode, a record mode, a voice recognition mode, a broadcast reception mode, and the like. Also, the audio output module 252 may also provide audible output signals related to a particular function (e.g., a call signal reception sound, a message reception sound, etc.) performed by the mobile terminal 200. The audio output module 252 may include a receiver, a speaker, a buzzer or the like.

A haptic module 253 may generate various tactile effects the that user may feel. A typical example of the tactile effect generated by the haptic module 253 may be vibration. Strength, pattern and the like of the vibration generated by the haptic module 253 may be controllable by a user selection or setting of the controller. For example, the haptic module 253 may output different vibrations in a combining manner or a sequential manner.

Besides vibration, the haptic module 253 may generate various other tactile effects, including an effect by stimulation such as a pin arrangement vertically moving with respect to a contact skin, a spray force or suction force of air through a jet orifice or a suction opening, a touch on the skin, a contact of an electrode, electrostatic force, etc., an effect by reproducing the sense of cold and warmth using an element that can absorb or generate heat, and the like.

The haptic module 253 may be implemented to allow the user to feel a tactile effect through a muscle sensation such as the user's fingers or arm, as well as transferring the tactile effect through a direct contact. Two or more haptic modules 253 may be provided according to the configuration of the mobile terminal 200.

An optical output module 254 may output a signal for indicating an event generation using light of a light source. Examples of events generated in the mobile terminal 200 may include a message reception, a call signal reception, a missed call, an alarm, a schedule notice, an email reception, an information reception through an application, and the like.

A signal output by the optical output module 254 may be implemented in such a manner that the mobile terminal emits monochromatic light or light with a plurality of colors. The signal output may be terminated as the mobile terminal senses a user's event checking.

The interface unit 260 may serve as an interface with every external device connected with the mobile terminal 200. For example, the interface unit 260 may receive data transmitted from an external device, receive power to transfer to each element within the mobile terminal 200, or transmit internal data of the mobile terminal 200 to an external device. For example, the interface unit 260 may include wired or wireless headset ports, external power supply ports, wired or wireless data ports, memory card ports, ports for connecting a device having an identification module, audio input/output (I/O) ports, video I/O ports, earphone ports, or the like.

The identification module may be a chip that stores various information for authenticating authority of using the mobile terminal 200 and may include a user identity module (UIM), a subscriber identity module (SIM), a universal subscriber identity module (USIM), and the like. In addition, the device having the identification module (referred to as 'identifying device', hereinafter) may take the form of a smart card. Accordingly, the identifying device may be connected with the terminal 200 via the interface unit 260.

When the mobile terminal 200 is connected with an external cradle, the interface unit 260 may serve as a passage to allow power from the cradle to be supplied to the mobile terminal 200 therethrough or may serve as a passage to allow various command signals input by the user from the cradle to be transferred to the mobile terminal therethrough. Various command signals or power input from the cradle may operate as signals for recognizing that the mobile terminal is properly mounted on the cradle.

The memory 270 may store programs for operations of the controller 280 and temporarily store input/output data (for example, phonebook, messages, still images, videos, etc.). The memory 270 may store data related to various patterns of vibrations and audio which are output in response to touch inputs on the touch screen.

The memory 270 may include at least one type of storage medium including a Flash memory, a hard disk, a multimedia card micro type, a card-type memory (e.g., SD or DX memory, etc), a Random Access Memory (RAM), a Static Random Access Memory (SRAM), a Read-Only Memory (ROM), an Electrically Erasable Programmable Read-Only Memory (EEPROM), a Programmable Read-Only memory (PROM), a magnetic memory, a magnetic disk, and an optical disk. Also, the mobile terminal 200 may be operated in relation to a web storage device that performs the storage function of the memory 270 over the Internet.

As aforementioned, the controller 280 may typically control the general operations of the mobile terminal 200. For example, the controller 280 may set or release a lock state for restricting a user from inputting a control command with respect to applications when a status of the mobile terminal meets a preset condition.

The controller 280 may also perform controlling and processing associated with voice calls, data communications, video calls, and the like, or perform pattern recognition processing to recognize a handwriting input or a picture drawing input performed on the touch screen as characters or images, respectively. In addition, the controller 280 may control one or combination of those components in order to implement various exemplary embodiment disclosed herein on the mobile terminal 200.

The power supply unit 290 may receive external power or internal power and supply appropriate power required for operating respective elements and components included in the mobile terminal 200 under the control of the controller 280. The power supply unit 290 may include a battery. The battery may be an embedded battery which is rechargeable or be detachably coupled to the terminal body for charging.

The power supply unit 290 may include a connection port. The connection port may be configured as one example of the interface unit 260 to which an external (re)charger for supplying power to recharge the battery is electrically connected.

As another example, the power supply unit 290 may be configured to recharge the battery in a wireless manner without use of the connection port. Here, is the power supply unit 290 may receive power, transferred from an external wireless power transmitter, using at least one of an inductive coupling method which is based on magnetic induction or a magnetic resonance coupling method which is based on electromagnetic resonance.

On the other hand, various embodiments described herein may be implemented in a computer-readable or its similar medium using, for example, software, hardware, or any combination thereof.

The foregoing present invention may be implemented as codes readable by a computer on a medium written by the program. The computer-readable media may include all kinds of recording devices in which data readable by a computer system is stored. Examples of the computer-readable media may include ROM, RAM, CD-ROM, magnetic tape, floppy disk, and optical data storage device, and the like, and also include a device implemented in the form of a carrier wave (for example, transmission via the Internet). In addition, the computer may include the controller 180 of the mobile terminal. Accordingly, the detailed description thereof should not be construed as restrictive in all aspects but considered as illustrative. The scope of the invention should be determined by reasonable interpretation of the appended claims and all changes that come within the equivalent scope of the invention are included in the scope of the invention.

What is claimed is:

1. An image capturing apparatus, comprising:
   a hollow body formed with opening portions at both ends thereof;
   a first cover provided with a window, and coupled to the body to cover one end portion of the body;
   a second cover coupled to the body to cover the other end portion of the body;
   a frame provided in an inner space of the body and coupled to the body; and
   an antenna provided between the frame and the body,
   wherein the frame comprises:
      a first recess portion recessed toward an inward direction to accommodate a lens assembly in the recessed space;
      a plate formed to face a lower surface of the first recess portion to be separated therefrom;
      a middle frame connected between the first recess portion and the plate; and
      lateral frames formed at both sides of the middle frame and formed in a direction crossing the middle frame,
      wherein the antenna is formed on an outer circumferential surface of the first recess portion and lateral frames, and
      wherein the antenna is fed from a feed terminal formed on the frame.

2. The image capturing apparatus of claim 1, wherein the antenna comprises:
   a first antenna formed on a lateral surface of the first recess portion and the lateral frames; and
   a second antenna and a third antenna formed on lateral frames formed adjacent to the plate, and
   the first through the third antennas are fed from the feed terminal formed on the frame.

3. The image capturing apparatus of claim 2, wherein an antenna forming region recessed to form the antenna is formed on an outer circumferential surface of the first recess portion and lateral frames, and
   the first through the third antenna respectively comprises a major surface portion from which the primary radiation of the antenna is directed, and a tail portion extended from one end portion of the major surface portion and formed in a thin and elongated manner.

4. The image capturing apparatus of claim 1, wherein the second cover comprises:
   a fastening portion in a plate shape fastened to the body and provided with a second recess portion; and
   a cap portion, one side of which is rotatably coupled to the fastening portion to open or close the second recess portion.

5. The image capturing apparatus of claim 4, wherein a plurality of through holes communicating with a plurality of holes formed on the plate are formed on the second recess portion.

6. The image capturing apparatus of claim 4, wherein a first waterproof member formed in close contact with the second recess portion to seal the plurality of through holes is formed on an inner surface of the cap portion facing the second recess portion.

7. The image capturing apparatus of claim 4, wherein a second waterproof member closely formed in close contact with the plate to seal a plurality of holes formed on the plate is formed on an inner surface of the fastening portion facing the plate.

8. The image capturing apparatus of claim 3, wherein a circuit board is provided in an upper space within a space limited by one surface of the middle frame, lateral frame, plate and first recess portion, and a battery is provided in a lower space therewithin.

9. The image capturing apparatus of claim 1, wherein a lens accommodation portion protruded toward the lens assembly is formed on an inner surface of the first cover.

10. The image capturing apparatus of claim 8, wherein the circuit board is formed by depositing two or more sub-circuit boards, and the sub-circuit boards are electrically connected to each other by a flexible printed circuit board in at least one region.

11. The image capturing apparatus of claim 10, wherein electronic components are mounted on at least one surface of the sub-circuit board, and shield members for blocking electromagnetic waves by the electronic components are formed thereon, and a shock absorbing member is provided between the shield members adjacent to each other.

12. The image capturing apparatus of claim 2, wherein the first recess portion has a shape corresponding to the lens assembly, and an audio input module accommodation portion in which a microphone module is accommodated is provided on an outer circumferential surface of the first recess portion, and a rubber member for surrounding the microphone module is provided in the audio input module accommodation portion, and a third waterproof member is provided between the audio input module accommodation portion and an inner surface of the first cover.

13. The image capturing apparatus of claim 8, wherein an upper frame coupled to the plate and first recess portion while covering the circuit board is formed at an upper side of the circuit board.

14. The image capturing apparatus of claim 13, wherein a third recess portion is formed on one surface of the upper frame, and a flexible printed circuit board is formed on the third recess portion, and a microphone module is connected to an end portion of the flexible printed circuit board.

15. The image capturing apparatus of claim 14, wherein one or more domes are provided on one surface of the flexible printed circuit board, and a button is formed in a region corresponding to the dome on an inner surface of the body.

16. The image capturing apparatus of claim 15, wherein the button comprises:
a pressing portion exposed to an outside; and
an actuator extended from one surface of the pressing portion to press the dome.

17. The image capturing apparatus of claim 12, wherein a waterproof member accommodation portion in which the third waterproof member is accommodated is formed on an inner surface of the first cover.

18. The image capturing apparatus of claim 4, wherein a flange protruded toward an outside is formed along an edge of the fastening portion, and part of the cap portion is fixed to the fastening portion by a hinge axis, and a button portion is provided in a region between the second recess portion and the flange, and the button portion is accommodated into a button groove formed on a lateral surface of the cap portion, and an elastic member for providing an elastic force to the button portion is provided between the flange and the button portion.

19. The image capturing apparatus of claim 1, wherein the first cover and the second cover are coupled to the body by a screw or adhesive.

20. The image capturing apparatus of claim 19, wherein a screw hole is formed on an outer surface of the body, and a screw insert is provided in the screw hole, and the screw is fastened to the screw insert to seal a portion at which the body is fastened to the first cover or second cover.

* * * * *